United States Patent [19]

Ware et al.

[11] 3,775,144

[45] Nov. 27, 1973

[54] COOKED FLOUR-CONTAINING CORRUGATED PAPERBOARD ADHESIVES AND USE THEREOF

[75] Inventors: Franklyn O. Ware, Atchison; Alan M. Hill, Topeka, both of Kans.

[73] Assignee: Lawrence Paper Company, Lawrence, Kans.

[22] Filed: May 7, 1971

[21] Appl. No.: 141,198

[52] U.S. Cl. .................. 106/150, 106/153, 106/213
[51] Int. Cl. ......................... C08b 25/02, C08h 7/00
[58] Field of Search .................... 106/150, 210, 149, 106/157, 213, 130, 153

[56] References Cited
UNITED STATES PATENTS

| | | | |
|---|---|---|---|
| 2,212,557 | 8/1940 | Baver | 106/150 |
| 2,466,172 | 4/1949 | Kesler et al. | 106/150 |
| 3,578,475 | 5/1971 | Alexander et al. | 106/150 |

OTHER PUBLICATIONS

Kerr, "Chemistry and Industry of Starch," Second Edition, Academic Press, Inc., N.Y.C., 1950, pp. 596–598.

*Primary Examiner*—Allan Lieberman
*Attorney*—Millen, Raptes & White

[57] ABSTRACT

An improved, viscosity-stable cooked flour-containing Stein-Hall type corrugated paperboard adhesive having an uncooked slurry portion and a cooked paste portion as a carrier therefor wherein the slurry portion comprises an amount sufficient to provide the requisite tack to the mixture of a smooth, stable homogeneous colloidal co-solution, substantially free of undissolved fiber, of both the protein and starch fractions of a proteinaceous grain flour, the protein fraction being substantially non-degraded and the starch fraction being essentially a chemically unmodified starch or as molecular weight reduced starch, which is chemically unmodified, the resultant adhesive being viscosity-stable with substantially higher tack than corresponding normally gellable conventional adhesives of the same flour content.

13 Claims, 1 Drawing Figure

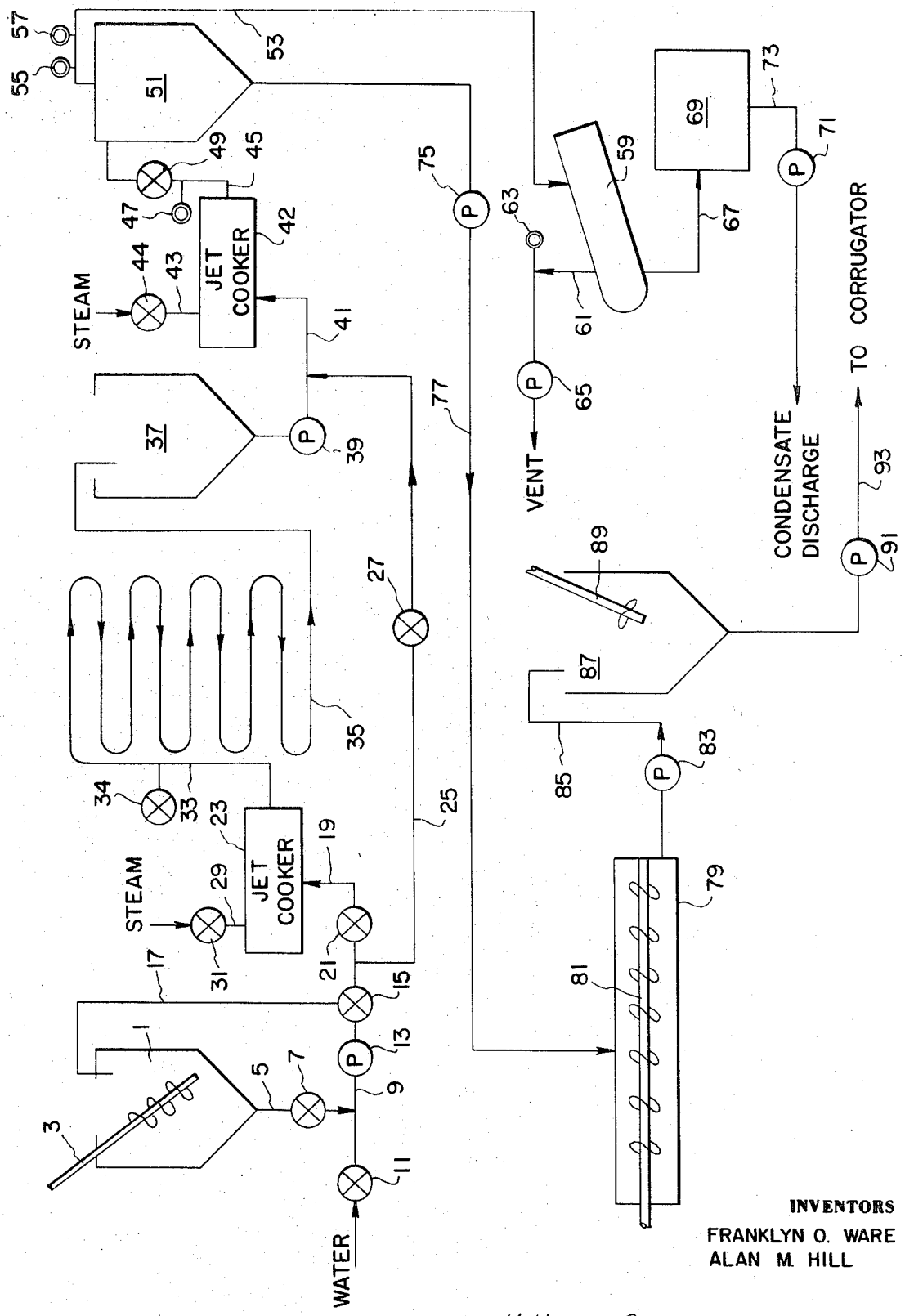

COOKED FLOUR-CONTAINING CORRUGATED PAPERBOARD ADHESIVES AND USE THEREOF

BACKGROUND OF THE INVENTION

This invention relates to novel cooked flour-containing adhesives and to their use in the preparation of corrugated paperboard.

In the production of corrugated paperboard, the adhesive conventionally employed to bond the corrugated liner to the facing sheets is a Stein-Hall starch-based adhesive in which about five-sixths of the starch is in the form of an uncooked aqueous starch suspension which is brought to the desired viscosity and provided with the requisite tack by a cooked starch paste, which also acts as a carrier to maintain the uncooked starch in suspension. The cooked portion is prepared separately and then blended with the uncooked starch slurry, which conventionally also contains caustic soda, to reduce the gelation time and temperature of the uncooked starch, and borax, to increase the tack of the adhesive. See U.S. Pat. No. 3,151,996 and 2,833,662. The starch is ordinarily cooked in a conventional manner, i.e., batch-wise by heating an aqueous slurry so as to gradually bring the temperature of the slurry to gelation temperature. Several processes have also been developed for cooking the starch slurry substantially instantaneously. See U.S. Pat. Nos. 2,717,213; 3,133,836; 3,228,781; 3,308,037; and 3,450,549. U.S. Pat. No. 3,228,781 employs such an instantaneous starch cooking method in the production of a Stein-Hall corrugated board adhesive. See also U.S. Pat. No. 2,609,326.

Because the viscosity of the final adhesive can be regulated by varying the proportion of cooked starch paste in the adhesive, the starch paste is not conventionally subjected to a viscosity-reducing enzyme treatment, in contra-distinction to paper sizes where the use of enzyme converted starch is conventional. See, e.g., U.S. Pat. No. 3,149,049 and U.S. Pat. No. 3,450,549. Processes for the production of corrugated board adhesive are, however, known in which a portion of the starch is enzyme converted. In U.S. Pat. No. 2,258,741, a portion only of the gelatinized starch is enzyme converted. In U.S. Pat. Nos. 2,824,037, enzyme or acid is employed as a gelatinizing agent. In U.S. Pat. No. 3,163,549, flour is converted to starch by eliminating the proteinaceous portion thereof with a proteolytic enzyme.

Because of the obvious economic advantages which would result if a flour-containing adhesive could be produced which performed satisfactorily in commercial production, considerable effort has been directed to the production of a commercially acceptable flour-based adhesive. See U.S. Pat. Nos. 2,051,025; 2,102,937; 2,212,557; 2,291,586; 2,466,172; 2,520,597; 2,881,086; 2,999,028; 3,163,549; and 3,251,703.

Bauer, U.S. Pat. No. 2,051,025 claims a process for forming corrugated paperboard employing as adhesive the mixture of gelatinized flour or starch and an ungelatinized portion as a carrier claimed in 2,102,937. However, this process, known as the Stein-Hall process, as developed and as widely used commercially today, employs starch exclusively. Bauer U.S. Pat. No. 2,212,557 discloses a potential adhesive composition which employs as a carrier a hydrosol of silica, alumina or magnesia, a natural gum, or one comprising gluten. Galber and Dike, U.S. Pat. No. 2,291,586 discloses the use of a seedmeal flour-based adhesive for making plywood under heat and pressure.

As pointed out by Kesler and Hicks, U.S. Pat. No. 2,466,172, when uncooked flour is employed as an adhesive, no adhesive value is obtained from the starch portion of the flour and when the flour is cooked to gelatinize the starch fraction, the product is unsatisfactory for many uses and the starch becomes modified in a non-uniform manner due to the natural enzymes in the flour, resulting in a product of variable viscosity. The patentees state that prior efforts to use flour as an adhesive have, therefore, not been uniformly satisfactory commercially. That patent claims a process for avoiding non-uniformity by inactivating the natural enzymes in the flour at a pH of about 9–10 at about 56° C. prior to cooking.

Griffin, U.S. 2,520,597 approaches the problem of the adverse effect of the natural enzymes in flour in the usual cooking operation by instantly raising the flour slurry to a cooking temperature of 200°–212° F. by dispersing the slurry in a large volume of boiling water. This dilution technique produces a low-solids paste suitable for use as a textile size.

Wimmer, U.S. Pat. No. 2,881,086 states that when corn flour is substituted for corn starch in the process of U.S. Pat. No. 2,051,025, the resulting material is very difficult to handle in large scale equipment for several reasons, one being the thixotropic character of the adhesive. Wimmer's claimed solution to the problem is the use of paste formed from an esterified flour as the carrier. The chemical cost associated with this approach offsets much of the economic advantage of the use of flour instead of starch.

Horner, U.S. Pat. No. 2,999,028 also discusses the thixotropic disadvantage of the use of flour-based adhesives and states that consequently flours, as such, are not ordinarily practical for corrugating machine operation. That patent states that this disadvantage is avoided by the use of a gelatinized waxy starch or flour consisting essentially of 100% amylopectin as the cooked carrier portion of Stein-Hall type corrugating adhesive. Such flours are not standard commercial grades of flour and thus not widely and continuously available at prices which would make their use instead of conventional starch particularly attractive, assuming all other production factors were equal.

Vollnik and Hunt, U.S. Pat. No. 3,163,549 states that the protein in flour is detrimental to the properties of adhesives produced therefrom and claim a process in which a substantial portion of the protein of the flour is broken down prior to cooking the flour with a proteolytic enzyme having little amylolytic activity. This, of course, eliminates the possibility of achieving any adhesive effect from the protein present in flour.

Fortney and Hunt, U.S. Pat. No. 3,251,703 also states that prior attempts to use grain flours for the corn starch used in the Stein-Hall process have not been successful. The patent notes that the thixotropic character and high viscosity of an adhesive formed from flour instead of starch precludes its use. When the proportion of gelatinized flour is reduced to overcome these effects, the resultant lowered viscosity and tackiness results in waste and unsatisfactory bonding. Their approach to the problem is the use as the uncooked portion of a finely ground flour of a specific particle size and quality in combination with a small percentage of certain gums as a carrier therefor. This process, like that of 2,999,028, is limited as to the type of flour which can be used. Neither process can use common commercial grades of flour, which offer the greatest economic advantage over starch if they could successfully be substituted in the Stein-Hall process.

For other art on the treatment of flour, starch, and processes for producing adhesives, see U.S. Pat. Nos. 1,911,400; 2,197,754; 2,222,306; 2,609,326; 2,657,163; 2,894,859; 3,029,192; 3,073,724; 3,137,639; 3,175,928; 3,251,748; 3,200,360; 3,337,414; 3,423,239; 3,434,901; and 3,490,922.

Notwithstanding the fact that flour-based adhesives adapted for use as the bonding agent in the preparation of corrugated paperboard have been known for over 35 years, flour-based adhesives have not received acceptance in the corrugating industry, except during wartime shortages of starch, and today starch-based adhesives are used almost exclusively. It is believed there is no substantial use today of a chemically unmodified flour-based adhesive in the corrugating industry, probably because such adhesives do not have the bond strength and other desirable properties of a starch-based adhesive. For example, substituting flour for starch in the cooked portion of a conventional Stein-Hall adhesive produces an adhesive having 70 percent or less of the bond strength of the corresponding all-starch adhesive. This fact, along with the production difficulties associated with the use of a flour-based adhesive, has made a flour-based adhesive an unattractive alternative to an all-starch adhesive.

It has now been found that a flour paste, prepared according to the process of this invention, can successfully be used as the carrier in a Stein-Hall type adhesive without the disadvantages of the prior art attempts to produce such an adhesive. Moreover, adhesion strengths as high and usually significantly higher than those obtained with comparable starch-based adhesives are achieved. Other advantages will be apparent from the description of the invention which follows.

OBJECTS OF THE INVENTION

It is an object of this invention to provide novel cooked flour-containing adhesives having improved properties. Another object is the provision of cooked flour-containing adhesives useful for the manufacture of corrugated paperboard. Still another object is the provision of a process for the manufacture of corrugated board using a cooked flour-containing adhesive of this invention as corrugating adhesive. A further object is the provision of an improved flour paste useful for the production of flour-based adhesives. Still another object is the provision of a novel process for the production of the improved flour pastes. Other objects will be apparent to those skilled in the art to which this invention pertains.

SUMMARY OF THE INVENTION

The novel adhesives of this invention are viscosity-stable cooked flour-containing adhesives comprising an amount of a cooked flour paste sufficient to impart substantial tack to the mixture, in which the flour paste is a smooth, stable, homogeneous colloidal co-solution, substantially free of undissolved fiber, of both the protein and starch fractions of a proteinaceous flour, the protein being present in substantially non-degraded form and the starch being present essentially as chemically unmodified or molecular weight reduced starch, whereby the resultant adhesive is viscosity-stable with substantially higher tack than corresponding normally gellable conventional adhesives of the same flour solids content.

This invention also relates to the production of corrugated paperboard employing the above-described adhesives.

DETAILED DISCUSSION

The adhesives of this invention have surprisingly advantageous properties which distinguish them from the flour-containing adhesives of the prior art. The cooked flour paste employed therein has a smooth texture quite different from the granular texture of conventional flour pastes. It is a homogeneous dispersion of both the protein and starch fractions of a proteinaceous flour with substantially higher tack then conventional pastes. It clings tenaciously to paper, filaments, yarn, metal and other articles to which it is applied. Its higher adhesiveness can readily be demonstrated by dipping a steel rod in the paste and observing the rate at which it is removed with running water, compared to a conventional flour paste of the same solids content. Bond strengths of materials bonded with the paste are higher than those obtained with a starch paste of the same solids content.

The flour paste of the adhesives of this invention is a smooth, homogeneous dispersion which varies in texture from smooth, creamy and semi-opaque solution-suspension to a clear, transparent solution, depending on whether only a portion or all of the fibrous fraction of the flour is dissolved. The clear solutions have somewhat better properties for some end uses. All are characterized by the protein fraction of the flour being in stable co-solution, in substantially non-degraded form, with the starch fraction of the flour. This marriage of the protein and starch of the flour is unique and is responsible for the improved properties of the paste and adhesives produced therefrom. Heretofore, the protein and/or fibrous fractions of flours caused problems which interfered with the use of flour as a substitute for starch in adhesives. In the adhesives of this invention, the protein fraction enhances their properties.

The protein fraction of the flour is present in the flour paste in substantially non-degraded form, i.e., it retains the physical properties possessed by soluble proteins in solution, in contradistinction to the flour pastes of U.S. Pat. No. 3,163,549 in which the protein has been degraded with proteolytic enzymes.

The presence of the protein fraction in the flour in non-degraded form as a stable co-solution with the starch fraction is a novel and characterizing feature of the flour pastes of this invention. It is known that flour proteins can be placed in colloidal solution at an alkaline pH at temperatures below the gelling temperature of starch. This procedure cannot be used to form a co-solution of both the protein and starch fractions because solubilization of the starch fractions requires a higher temperature, which results in severe degradation of the protein fraction. If flour is cooked conventionally, none or only an insubstantial portion of the protein is solubilized in non-degraded form. If the protein and starch fractions are separately solubilized and thereafter blended, a stable co-solution does not result. The resulting blend has poorer adhesive properties than either of the solutions separately.

In contradistinction, the technique employed to produce the novel flour pastes of this invention, i.e., substantially instantaneous heating of the flour slurry to a temperature substantially above 100° C. at about neutrality or alkaline or a slightly acid pH, while subjecting the slurry to high mechanical stress, and thereafter promptly cooling the cooked paste to below the degradation temperature of the protein fraction, results in a stable co-solution of all or substantially all of both the starch and the protein fractions of the flour without substantial degradation of the protein.

The flour pastes of this invention are free from or substantially free from the large, e.g., 15–30 percent, undissolved particulate matter normally present in starch pastes produced from conventional mill grades of flour, e.g., broken hulls and other fibrous matter and undissolved proteinaceous materials, which impart a granular texture to conventional cooked flour pastes. This substantial freedom from particulate matter is apparently due to the combination of high cooking temperature and high mechanical stress to which the flour paste is subjected during the cooking step. Although finer grades of flour do not contain the large gross particles present in mill grades of flour, even the finer grades of flour produce a granular textured paste when cooked conventionally because of the large amount of finely divided fibrous and proteinaceous material which remains undissolved.

In the flour pastes of this invention, all or substantially all of the starch fraction of the flour is present as a colloidal solution. Any undissolved material is relatively low in starch content. The clear solutions are completely or substantially free of undissolved material.

As used herein the term starch fraction means the carbohydrate fraction separable from flours by conventional physical means. The term protein fraction means the proteinaceous fraction remaining after the starch fraction has been separated. This ordinarily is associated with fiber, ash, traces of oil and sugars present in flours.

The starch fraction of the flour in the flour paste is present essentially as chemically unmodified starch or as molecular weight reduced, preferably enzymatically converted, starch so as to reduce the viscosity of the paste. Because any chemical modification of the starch fraction tends to reduce somewhat the improved properties of the flour paste, it is ordinarily preferred to use unconverted flour and regulate viscosity by reducing the solids content of the flour paste or varying the proportion thereof in the final adhesive. Because of their high adhesion values, the novel flour pastes can be used at substantially lower solids content than the flour and starch pastes of the prior art without losing the requisite tack. Where a high solids flour paste of reduced viscosity is desired, the viscosity of the paste can be reduced by enzymatically converting the starch fraction. Chemical means can also be employed, so long as they do not significantly degrade the protein fraction. The enzymatic conversion of the starch portion of the flour can be conducted prior to or after cooking the flour slurry to form the stable co-solution of the protein and starch fractions.

The flour used in the preparation of the adhesives of this invention is preferably corn, milo, or wheat flour. However, any proteinaceous flour can be used, e.g., buckwheat, rye, barley, oat and other grain flours. In contradistinction to the process of U.S. Pat. No. 3,251,703, which requires the use of an uncooked flour having a particle size such that at least 80 percent passes a U.S. Ser. No. 200 sieve and not more than 1 percent remains on a U.S. Ser. No. 70 sieve, ordinary straight mill grades of flour can be used to form the cooked flour paste and are preferred because of their lower cost. More highly refined grades, e.g., reduction flour, finely ground brewers grits, can, however, be employed if desired.

Although the starch and protein contents of the flour employed is usually determined by the particular flour employed, it will be apparent that the starch/protein ratio of the flour pastes of this invention can be regulated by the use or addition of a material having a protein content higher than grain flours, e.g, soybean flour, gluten, corn feed, or lower than grain flours, e.g., corn, wheat, rice or tapioca starch. The addition of an additional source of protein is useful when a low viscosity, high tack, low-solids flour paste is desired. A flour rich in protein, e.g., soybean flour, can also be added when using a flour lacking or relatively deficient in protein, e.g., rice or tapioca flour. The ratio of starch to protein in these blends should be greater than 1:1, preferably at least 2:1.

The starting flour slurry is prepared in a conventional manner, i.e., uniformly dispersing the flour in water to the desired solids content. Any solids content up to that which will set up on cooking can be used, e.g., 5 to 45 percent, preferably 10 to 36 percent, more preferably about 20 to 32 percent.

When the adhesive is employed in the production of corrugated paperboard, a relatively high solids adhesive is employed. In such a case, it is preferred to employ a high solids flour paste, e.g., about 25 to 35 percent. Also, the smooth, homogeneous stable co-solution of the protein and starch fractions of the flour which characterizes the adhesives of this invention are more readily produced when the solids content of the flour slurry is higher.

When cooking the flour, any conventional pH can be employed. However, the pH should not exceed that at which the protein is substantially degraded to non-proteins. A pH near neutrality is usually employed. A slightly acid pH, e.g., pH 6.6 - 6.8, is preferred when the flour is enzymatically converted prior to or after cooking. An alkaline pH, e.g., 9–13, preferably about 12, can be employed to reduce the viscosity of the finished adhesive, especially adhesives in which the cooked portion is high in protein, e.g., 15–25 percent.

Although it is preferred that only flour and water be present in the slurry, other materials which have been employed to modify the characteristics of the carrier portion can also be present, e.g., inorganic or organic hydrosols, as described in U.S. Pat. Nos. 2,212,557 and 3,251,703.

Because of its protein content, the flour paste is more susceptible than starch pastes to bacterial, fungal or yeast degradation. Therefore, a preservative should be added if the paste is not used within 8–12 hours after cooling below 140° C., e.g., formaldehyde, the Dowacides, or any other preservative conventionally employed to inhibit microbiological activity.

The flour paste employed in the cooked flour-containing adhesives of this invention is produced by cooking the flour slurry in a manner in which the resulting paste is a smooth, stable homogeneous colloidal cosolution of at least a predominant portion of both the protein and starch fractions of the flour, the protein fraction being present in substantially non-degraded form and the starch fraction being present essentially as chemically unmodified or molecular weight reduced starch. In such a physical condition, the flour paste imparts surprisingly advantageous properties to starch-slurry adhesives which employ the flour paste as a carrier. Such a flour paste can be produced by cooking the flour slurry substantially instantaneously at temperatures above cooking temperatures conventionally employed when cooking flour while subjecting the slurry to a high degree of agitation and shearing action in excess of that required for uniform blending. For apparatus suitable for imparting this excess mechanical energy, see U.S. Pat. Nos. 2,609,326; 2,717,213; 3,228,781; 3,308,037; 3,133,836; 3,337,414; and 3,450,549. A particular useful method employs steam to provide the requisite shearing force, using the cooking apparatus of U.S. Pat. Nos. 3,211,564 or 3,133,836. Because the flour slurry mixes with the steam as they both pass through a highly restricted orifice or orifices, the steam and slurry are mixed at extremely high velocities thereby imparting the mechanical energy necessary to break up the flour particles and produce a smooth, homogeneous co-solution of both the protein and starch fractions of the flour. Usually all or substantially all, e.g., at least 90 percent of the protein and the starch fractions of the flour are dissolved, the protein being present in substantially non-degraded form and the starch being present essentially as chemically unmodified or as molecular weight reduced starch. At high temperatures and/or in the presence of very large amounts of excess mechanical energy, e.g., provided by steam in excess of that required to bring the slurry to the desired cooking temperature as described in U.S. Pat. No. 3,133,836, all of the flour particles, including the fibrous particles, are dissolved, thus producing a clear, transparent solution. At lower temperatures and/or lower levels of mechanical stress not all of the fibrous fraction is solubilized so that the paste is no longer transparent but still has a characteristic creamy, smooth texture which is quite dissimilar from conventional flour pastes.

For another example of equipment used to subject the flour slurry to a high shearing force, see U.S. Pat. No. 2,526,599. High mechanical energy can also be provided with an ultrasonic disintegrator, e.g., the Branson "sonifier" (Heat Systems Co., 60 Broad Hollow Road, Melville, N.Y.). Adding air, heated to a temperature which offsets the cooling effect by evaporation of the water in the slurry, to the steam employed in U. S. Pat. No. 3,211,564, will increase the velocity of the flour slurry through the orifices of the cooking apparatus, thereby providing a higher shearing force. Compressed air instead of steam, if heated sufficiently to provide the requisite heat to bring the slurry to the desired cooking temperature, will also increase the shearing force achieved in the apparatus of 3,211,564.

The cooking temperature required to provide the co-solution which characterizes the novel flour pastes varies inversely with the mechanical energy provided during the cooking step, e.g., about 115° to about 175° C. or even higher, preferably about 120° to 165° C., more preferably about 140° to 160° C. A cooking temperature is employed which results in substantially instantaneous cooking of the flour so as to ensure that no significant degradation of the proteinaceous fraction of the flour occurs. The use of injected steam to heat the slurry to the desired temperature is preferred because of the rapidity at which cooking temperature can be reached.

As stated above, if the slurry is subjected to sufficient mechanical energy while being cooked, a clear, transparent paste is produced. A lesser amount of energy produces a smooth, creamy semi-opaque paste. Both can be readily distinguishable by touch from the granular textured flour pastes prepared in a conventional manner. The novel pastes are colored, including yellow (corn), pale violet (milo) and brown (wheat).

After cooking, the flour paste is cooled as rapidly as possible to below cooking temperature, e.g., 20°–80° C. Because of their viscosity, cooling by indirect means is inefficient and direct cooling is preferred. A convenient technique is releasing the hot paste into an evacuated chamber maintained at a partial pressure which cools the hot paste to the desired temperature by evaporation.

After cooling, the flour paste can be subjected to an enzymatic viscosity reduction step, which can be conducted in a conventional manner using, e.g., a liquifying or saccharifying amylase, such as, for example, $\alpha$-amylase, $\beta$-amylase, glucoamylase, etc. The amount which is used is dictated by the solids content, time of incubation, temperature of incubation and desired viscosity of the finished adhesive. Usually, enzymatic conversion is conducted at an enzyme concentration of about 0.05 to 1 percent, preferably about 0.1 percent, by weight calculated on total solids, for about 3 to 15 minutes at 77° C. to several hours at 45° C., until a lower viscosity is reached which imparts the desired viscosity to the final adhesive, e.g., about 18 to 70, preferably about 20–50 Stein-Hall units.

The enzyme action is then halted in a conventional manner to prevent further breakdown of the starch molecule, preferably with heat, e.g., at about 121° C. or higher. At lower temperatures, e.g., 92°–100° C., enzyme inactivation is not instantaneous. Therefore, further viscosity reduction occurs during inactivation, which requires starting at a higher viscosity than the desired final viscosity. Chemical means, e.g., copper sulfate and sodium phosphate, can also be used as well as pH adjustment, e.g., to about pH 4.

As stated above, the enzyme conversion can be and preferably is conducted prior to the cooking step, in which case the cooking step can be employed to inactivate the enzyme.

The cooked flour paste can be used to advantage as an adhesive wherever starch paste adhesives are employed, e.g., as a binder for charcoal briquettes and casting cores, and as an adhesive for gypsum board solid fibreboard and plywood. Because of their higher adhesive values, a lesser volume of flour paste and/or a lower solids content paste is required to achieve the desired adhesion or binding effect than is required with conventional starch pastes.

The adhesives of this invention consist at least partially of a cooked proteinaceous flour paste. The term "proteinaceous flour" as used herein means a flour containing substantial amounts of both protein and starch, the cooked paste produced therefrom being a stable colloidal co-solution of the protein and starch fractions thereof. Also present in the pastes in solubilized or substantially solubilized form are the other ingredients normally associated with proteinaceous flours, e.g., fiber, ash, traces of oil and soluble sugars.

The preferred adhesives of this invention are the Stein-Hall type, i.e., having an uncooked portion and a cooked portion as a carrier therefor, the ratio of uncooked portion to cooked portion usually ranging from about 2:3 to 6:1, preferably about 1:1 to 5:1, based on total solids, the exact proportion being determined by the viscosity and tack desired in final adhesive. In one preferred aspect, a proteinaceous flour is employed in the cooked portion and a conventional mill grade starch is employed in the uncooked portion.

In another preferred embodiment, a predominant portion or all of the finished adhesive is cooked. Such an adhesive has the advantage that the large amount of heat conventionally required to permanently bond the facing sheets to the liner is not required. A limiting factor in the use of a predominantly or completely cooked adhesive is the desired viscosity of the finished adhesive. Because the viscosity of such an adhesive ordinarily is higher than a conventional Stein-Hall adhesive, appropriate adjustment of the glue rolls and/or reduction of viscosity enzymatically or by pH adjustment prior to cooking will be required. The viscosity of the final adhesive can be reduced by subjecting the cooked paste to an enzymatic, e.g., amylase, molecular weight reducing treatment before or after cooking as described above or by cooking the flour at a high pH, e.g., 9–13, preferably about 12, which produces a cooked paste of substantially lower viscosity. As will be apparent, lesser amounts, e.g., 50–75 percent, of the borax and 75–90 percent of the caustic normally employed in a conventional Stein-Hall adhesive to increase tack and reduce gellation temperature and time will be required.

Since the economic advantage of using flour as a substitute for starch is increased as the proportion of flour to starch is increased, several approaches were made to increasing the flour content of the adhesive. As stated above, one approach is to reduce the viscosity of the cooked portion enzymatically and/or cooking at a high pH, thus permitting a higher proportion of cooked to uncooked portions. Since it was discovered that the cooked portion can contain higher amounts of protein than is present in conventional mill grades of flour, an attempt was made to separate mill grade corn flour into a high protein fraction and a low protein fraction by air classification, the high protein fraction to be used in the cooked fraction and the lower protein fraction to be used in the uncooked portion. Mill grade flour was therefore air classified using a Double Wall Double Wizzer mechanical air separator (Combustion Engineering, Inc., Raymond Div., Chicago, Ill.).

Passing mill grade corn flour through the air classifier with its fins adjusted to give a 50:50 separation yielded a dark, i.e., course, fraction which was successfully substituted for mill grade corn flour in the cooked portion and a light, i.e., fine, fraction which was successfully substituted for cornstarch in the uncooked portion. The viscosity of the adhesive was adjusted by adjusting the solids content of the cooked portion (or, alternatively, by subjecting the cooked fraction to an enzymatic viscosity reduction treatment as described above and/or by mixing the light fraction with cornstarch so as to increase the weight ratio of uncooked to cooked solids). The adhesive was viscosity stable and did not exhibit the viscosity "set-back" on standing typical of flour-based Stein-Hall adhesives. It performed well on production equipment.

In order to balance the consumption of dark and light fractions, the dark fraction was again passed through the air separator, yielding another approximately 50:50 dark and light fraction, the latter being mixed with the light fraction obtained from the first pass through the equipment, yielding a 70–75 percent light fraction and a 25–30 percent dark fraction. These fractions were used in preparing the uncooked and cooked portions, respectively, of an otherwise conventional Stein-Hall adhesive, again adjusting its viscosity by varying the solids content of the cooked portion and the caustic and borax content of the finished adhesive. This adhesive performed even better than the 50:50 formulation, due to the higher solids content of the cooked portion.

Since the protein in flour was believed in the prior art to be responsible for the thixotropic properties of Stein-Hall type adhesives using flour in the uncooked portion (See U. S. Pat. No. 3,251,703, Col. 5, lines 1–6), it was assumed the successful use of the light fraction of the air classified mill grade corn flour was due to the removal of the protein therefrom. Surprisingly, the light fraction had about the same protein content as the dark fraction. The difference in the two fractions appeared to be more physical than chemical in nature, i.e., the light fraction consisted almost entirely of particles of which passed through a 140 sieve, i.e., about 88 percent passed through a 250 sieve.

To determine whether other flours of a fine particle size could also be substituted for cornstarch, reduction flour was substituted for cornstarch in a conventional Stein-Hall corrugating adhesive. With appropriate reduction in borax and caustic to compensate for its increased viscosity, the adhesive performed perfectly in a long run on production equipment. This result was most surprising, in view of the teaching of U. S. Pat. No. 3,251,703 that finely ground corn flour could not be used in a conventional Stein-Hall corrugating adhesive because of its protein content. It appears that the grinding process of that patent did not produce a flour of a sufficiently fine particle size to eliminate the thixotropic properties of flour-based adhesives.

The following is the analysis of the 70:30 air classified mill grade corn flour and the reduction flour employed in these adhesives:

| Sieve No.[1] | Air Classified Corn Flour | | Reduction Flour | |
|---|---|---|---|---|
| | Dark Fraction | Light Fraction | Dark Fraction | Light Fraction |
| 60 | 0.3% | 0.0% | 3.4% | 0.2% |
| 80 | 26.2% | 0.0% | 17.8% | 1.0% |
| 100 | 58.9% | 0.8% | 36.8% | 2.8% |
| 140 | 3.1% | 1.2% | 17.2% | 8.6% |
| 200 | 7.6% | 5.2% | 14.6% | 50.0% |
| 250 | 0.9% | 4.4% | 1.4% | 0.4% |
| >250 | 1.3% | 88.0% | 6.0% | 36.4% |

[1] retained

It can be seen from these data that the flours which proved operable as the uncooked portion of a Stein-Hall type viscosity stable adhesives were relatively low in content of particles larger than about 115 microns, i.e., less than 15 percent was retained on a 140 mesh sieve. In the case of the air classified corn flour, the light fraction consisted essentially of extremely small particles, i.e., smaller than about 75 microns, so that less than 10% was retained on a 200 mesh screen.

From the above, it is apparent that an invention related to the use of a cooked flour paste as defined herein in a corrugated paperboard adhesive is the use of a flour slurry as the uncooked portion of a corrugated paperboard adhesive. Such a slurry can be used in a Stein-Hall type adhesive with any carrier conventionally employed in such adhesives, e.g., a starch paste, a synthetic or natural gum or gel, or a flour paste as defined herein. Illustrative examples are the following:

| Cooked Carrier Portion | | Uncooked Slurry Portion | |
|---|---|---|---|
| Example A | | | |
| Dark fraction, Air fractionated mill Grade corn flour | 90 lb. | Light fraction, Air fractionated Mill grade corn flour | 600 lb. |
| Water | 40 gal. | Borax | 10 lb. |
| Caustic | 13 lb. | Water | 175 gal. |
| Example B | | | |
| Corn starch | 116 lb. | Reduction flour | 600 lb. |
| Water | 50 gal. | Water | 175 gal. |
| | | Caustic | 13 lb. |
| | | Borax | 10 lb. |

The Dark and Light Fractions of Example A have the sieve analysis given above. The cooked slurry is prepared substantially in the manner described in Example 1, except the caustic and enzyme is omitted from the slurry and theoretical steam is injected in cooker 23 to bring the slurry to 155° C. The cooked paste is immediately cooled to 100° C., the caustic is added and the paste then brought to 155° C. in cooker 42 with theoretical steam. The uncooked portion is formed into a slurry in a conventional manner and the finished adhesive prepared from the slurry and cooked paste in a 6½ to 1 ratio (solids).

In Example B, the starch paste and uncooked slurry are prepared in the conventional manner and are used in a 5.2 to 1 ratio (solids).

An integral aspect of the use of a flour as defined herein in the viscosity stable composite adhesives is the amount of borax and caustic present in the finished adhesive. Whereas substantial amounts are used in a conventional starch-based adhesive, e.g., 2 percent – 3 percent of each, calculated on starch solids, when flour is used in the uncooked portion, these amounts produce a viscosity-unstable finished adhesive. This is readily seen when using reduction flour in both the cooked and uncooked portions. When conventional amounts of caustic and borax are employed, the finished adhesive retrogrades to an unusable very viscous mass which does not become fluid again on stirring. However, when the amount of caustic and borax is reduced to an amount below that which imparts the requisite tack and gel temperature to a starch-based adhesive, i.e., between about 1–2 percent each, a viscosity stable adhesive results which has as good or better adhesion than a standard starch-based Stein-Hall adhesive.

The following are examples of corrugating adhesive formulations of this invention employing corn starch (CS), wheat starch (WS), mill grade corn flour (CF), reduction flour (RF), enzymatically converted mill grade corn flour (CFM), mill grade corn flour air fractionated into a 50 percent dark fraction $(CF(d)_{50})$ and a 50 percent light fraction $(CF(1)_{50})$ and/or mill grade corn flour air fractionated into a 70 percent dark fraction $(CF(d)_{70})$ and a 30 percent light fraction $(CF(1)_{30})$, the uncooked starch slurry in each instance being blended with between about 1–2 percent by wgt., calculated on starch solids, of borax to regulate tack, between about 1–2 percent by wgt., calculated on starch solids, caustic to regulate gel temperature and time and about 30 to 40 gal. of water per 100 lbs. of starch solids and the flour slurry being cooked at a concentration of 3 lbs/gal.

TABLE I

| | Uncooked Solids lbs. | Cooked Solids lb. | Ratio of uncooked/cooked | Ratio of starch Flour |
|---|---|---|---|---|
| 1(a) | 500 CS | 100 CF | 5:1 | 5:1 |
| (b) | 500 WS | 100 CF | 5:1 | 5:1 |
| 2(a) | 400 CS | 200 CFM | 2:1 | 2:1 |
| (b) | 400 WS | 200 CFM | 2:1 | 2:1 |
| 3(a) | 300 CS | 300 CFM | 1:1 | 1:1 |
| (b) | 300 WS | 300 CFM | 1:1 | 1:1 |
| 4(a) | 400 CS 100 CF$(1)_{50}$ | 100 CF$(d)_{50}$ | 5:1 | 2:1 |
| (b) | 400 WS 100 CF$(1)_{50}$ | 100 CF$(d)_{50}$ | 5:1 | 2:1 |
| 5(a) | 300 CS 150 CF$(1)_{50}$ | 150 CF$(d)_{50}$ | 3:1 | 1:1 |
| (b) | 300 WS 150 CF$(1)_{50}$ | 150 CF$(d)_{50}$ | 3:1 | 1:1 |
| 6(a) | 200 CS 200 CF$(1)_{50}$ | 200 CF$(d)_{50}$ | 2:1 | 1:2 |
| (b) | 200 WS 200 CF$(1)_{50}$ | 200 CF$(d)_{50}$ | 2:1 | 1:2 |
| 7(a) | 300 CF$(1)_{50}$ | 300 CF$(d)_{50}$ | 1:1 | (all flour) |
| 8(a) | 457 CS 43 CF$(1)_{30}$ | 100 CF$(d)_{70}$ | 5:1 | 2.5:1 |
| (b) | 457 WS 43 CF$(1)_{30}$ | 100 CF$(d)_{70}$ | 5:1 | 2.5:1 |
| 9(a) | 386 CS 64 CF$(1)_{30}$ | 150 CF$(d)_{70}$ | 3:1 | 1.8:1 |
| (b) | 386 WS 64 CF$(1)_{30}$ | 150 CF$(d)_{70}$ | 3:1 | 1.8:1 |
| 10(a) | 314 CS 86 CF$(1)_{30}$ | 200 CF$(d)_{70}$ | 2:1 | 1.1:1 |
| (b) | 314 WS 86 CF$(1)_{30}$ | 200 CF$(d)_{70}$ | 2:1 | 1.1:1 |
| 11(a) | 420 CF$(1)_{30}$ | 180 CF$(d)_{70}$ | 7:3 | all flour |
| (b) | 420 RF | 180 RF | 1:3 | (all flour) |

To reduce viscosity and increase tack, the cooked portion can be re-cooked at an alkaline pH, e.g., pH 12.

To produce a corrugated paperboard adhesive, the cooked flour paste is blended with an uncooked starch slurry in a conventional manner, e.g., in a one to five ratio, calculated on total solids. This ratio of cooked solids to uncooked solids can vary widely, i.e., the proportion of cooked flour can vary from about one-thirty second to 100 percent, preferably about one-twelfth to one-half, more preferably about one-sixth to about one-third, the exact proportion depending on the desired final viscosity of the flour/starch blend and the viscosity of the flour paste. To achieve a viscosity conventional for a Stein-Hall type corrugated paperboard adhesive, less than conventional proportion of flour solids can be employed or the flour solids can be enzyme converted to an extent that the final adhesive has a viscosity corresponding to that of a starch paste of about the same solids content. The use of a flour paste of lower solids content has the advantage of reduced adhesive consumption and more economical cost of adhesive production. The use of a flour paste of a lower solids content than is conventional with starch pastes is possible because of the higher adhesive values, i.e., tack, imparted to the final adhesive by the flour paste.

Other ingredients conventionally employed in Stein-Hall type corrugated paperboard adhesives can and preferably are employed in the novel adhesives of this invention. For example, about 0.25 to 2 percent, preferably 0.5 to 1 percent, calculated on total solids of borax, can be employed to increase tack and/or about 0.5 to 2 percent, preferably about 1 to 1.5 percent, calculated on total solids, of caustic soda or other alkali can be added to regulate gelation temperature.

The resulting corrugating adhesive can be used like a conventional Stein-Hall starch adhesive in the production of corrugated paperboard. Generally, the adhesive pick-up required to manufacture satisfactory board is less because of the higher adhesion values of the novel adhesives. For the same reason, total adhesive consumption on a total solids basis often is less because of the lower solids content of the adhesive required to achieve a satisfactory bond in the final product.

Apparatus useful for the preparation of the novel corrugated paperboard adhesive of this invention is shown in the drawing. A flour and water slurry is maintained in uniform suspension in a slurry tank 1 by a lightning stirrer 3. A discharge line 5, fitted with a shut-off valve 7, provides communication from the bottom of tank 1 to a water supply line 9, at a point between a shut-off valve 11 and a centrifugal pump 13 mounted in the water supply line. Mounted to the discharge end of centrifugal pump 13 is a 2-way valve 15 to which is connected a recirculating line 17, which permits top filling of the tank with water and recirculation of the contents of the tank; and line 19 fitted with a shut-off valve 21, which communicates with a jet cooker 23 (Hydroheater, Hydrothermal Equipment Corporation, Milwaukee, Wisconsin).

Mounted in line 19, between 2-way valve 15 and valve 21 is a by-pass line 25, fitted with a shut-off valve 27. Fitted to the jet cooker is a steam supply line 29, equipped with a shut-off valve 31. Communicating with the discharge end of jet cooker 23 is a line 33, fitted with thermometer 34, which provides communication with an elongate enzyme incubation line 35, which discharges into a flour paste holding tank 37.

The bottom of holding tank 37 is fitted with a variable speed centrifugal pump 39, connected to a line 41 which provides communication with a second jet cooker 42, which is connected to a steam supply line 43 fitted with a shut-off valve 44. By-pass line 25 is also connected to line 41. The discharge end of jet cooker 43 is connected by line 45, which is fitted with a thermometer 47 and a back-pressure valve 49, and connected to flash chamber 51. Vapor phase discharge line 53, fitted with a thermometer 55 and a steam gauge 57, provides communication from flash chamber 51 to the inlet end of a water cooled heat exchanger 59. Uncondensed gases are removed from the heat exchanger through line 61, fitted with vacuum gauge 63 and vented to the atmosphere by a vacuum pump 65. Condensate is discharged from the heat exchanger through line 67 into a condensate reservoir 69, from which it is pumped by a centrifugal pump 71 through line 73 to the sewer.

A rotary pump 75 in line 77 pumps the liquid phase from flash chamber 51 to a conventional secondary mixer tank 79, fitted with a stirrer 81 having propeller-type agitator blades. Fitted to the bottom of mixer tank 79 is a gear pump 83, which pumps the contents of the mixer tank through line 85 to an adhesive storage tank 87, equipped with a stirrer 89. Finished adhesive is pumped by gear pump 91 through delivery line 93 to either or both stations of the corrugator.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Slurry tank 1 is charged with 200 gallons of water and 800 pounds of corn flour, and agitated with lightning mixer 3. To this flour slurry is added 12 ounces of 50 percent caustic soda to bring the pH to 6.6 – 6.8. Seven ounces of Dexlo alpha amylase enzyme are then added to the slurry. Valve 7 is closed and valve 11 is opened, which allows water to flow from the city water supply to positive displacement pump 13. Two-way valve 15 and valve 21 are opened and valve 27 closed. Steam inlet valve 31 is adjusted to heat the water in jet cooker 23° to 88° C., which discharges the cooked flour paste into incubation chamber 37 and then into line 41, where positive displacement pump 39 pumps the material to the second jet cooker 42. The steam inlet valve 44 is adjusted to give sufficient btu's so that at 65 pounds of back pressure, obtained by adjustment of valve 49, the temperature is maintained at 155° C. on the thermometer 47. The water then discharges into the flash chamber 51.

Sixty-five gallons per minute of 5° C. water are passed through the cooling coils of the heat exchanger 59. Steam discharges through 6-inch line 53 into heat exchanger 59 where it is condensed and the air is cooled to 44° C. The steam condensate drains into reservoir 69 and is pumped to the sewer by centrifugal pump 71.

Barometric pump (Nash) 65 creates a vacuum of 17 inches of mercury in the flash chamber, giving a resultant boiling point to the finished material of 77° C. The discharge from the flash chamber is pumped by Viking rotary pump 75 to the mixing tank 79. The equipment is now in adjustment and the incubation chamber heated to its equilibrium temperature.

When the equipment is in adjustment and the incubation chamber 35 heated, valve 11 is closed and valve 7 is opened. The flour slurry is transported by pump 13 to jet cooker 23 where it is mixed with an amount of steam sufficient to bring the slurry to an incubation temperature of 85° C. and transported through the incubation line 35 which, with 156 feet of 3-inch pipe, gives exposure to the enzyme for 10 minutes at that temperature.

After being discharged from the incubation chamber into 55-gallon barrel 37, positive displacement pump 39 transports the enzyme-converted flour to second jet cooker 42 where it is now mixed with an amount of steam sufficient to bring the partially cooked slurry to 155° C., which instantaneously kills the enzyme and marries the protein and carbohydrate by forming a cosolution of a predominant portion or all of the protein and starch fractions. If desired, steam in excess of that required to bring the slurry to the desired cooking temperature can be supplied so as to provide additional shearing action.

The flash chamber 51 now separates the excess steam and the vacuum created by pump 65 brings the boiling point of the flour paste to 77° C. at the 17 inches of mercury created, and the resultant excess steam is condensed in the heat exchanger 59. When sufficient mechanical energy is supplied, the enzyme-finished cooked flour paste is a transparent, bright yellow colloidal co-solution of both the proteinaceous portion of the flour, in substantially undegraded form, and the enzyme converted starch portion. It is substantially free from undissolved particulate material, with a viscosity (Stein-Hall) of 30–50 sec. At lower energy levels, a milky colored creamy textured colloidal solution is produced. The cooked flour paste is discharged at the bottom of flash chamber 51 and a rotary pump (Viking) 75 transports it to conventional (Henry Pratt) secondary mixing equipment 79. The secondary mixer is previously charged with 200 gallons of water, 800 pounds of mill grade wheat starch (Midwest Solvents) and 15.2 pounds of borax. Agitation with agitator 81 produces a good milked-out slurry.

Addition of the enzyme-converted paste is continued until slurry tank 1 is empty. Valve 7 is then closed and valve 11 is opened so that water clears the equipment and water appears in the discharge line 77, at which time the equipment is shut down. The resulting mixture is a 50:50 by volume mixture of uncooked wheat starch slurry and cooked flour paste with a cup viscosity of about 20–30 seconds.

After 15 minutes of mixing time in the secondary mixer, 20 pounds of flake caustic soda dissolved in 20 gallons of water is added slowly to the mix. Thirty-seven percent formaldehyde is added at the rate of one quart to 900 gallons of finished adhesive to prevent spoilage if the adhesive is not used immediately. It is then allowed to mix for another 5 to 10 minutes and is pumped to storage tank 89 by gear pump 83. The finished corrugated adhesive is continuously pumped to the corrugator at both stations by gear pump 91 through a 2-inch pipe delivery line 93.

The thus-produced adhesive is viscosity stable with excellent rheological properties. It does not gel on storage, set up in the adhesive pans, plug pipelines or foul the corrugator. In all respects, its properties are as good or better than a conventional Stein-Hall adhesive.

EXAMPLE 2

Following the procedure of Example 1, 324 gallons of adhesive are prepared from the following mixes:

| Primary | | Secondary | |
|---|---|---|---|
| Corn flour | 540 lb. | Wheat starch | 400 lb. |
| Water | 136 gal. | Water | 100 gal. |
| Enzyme | 1,200 cc. | Caustic | 11.5 lb. |
| | | Borax | 7.6 lb. |

The corn flour paste/wheat starch slurry adhesive of Example 2 was used to prepare several grades of corrugated board on a 78-inch corrugator. Pick-up at 0.005 inch glue roll setting was about 2.5 – 2.6 gal./1,000 sq. ft. Lower pick-up levels were not possible with the applicator production equipment employed. Over 300,000 square feet of corrugated paperboard as described below were manufactured with the above-described adhesive.

All of the board which was not subjected to the standard adhesion test was determined subjectively by delaminating samples by hand to have above average adhesion. In many cases, the flutes were destroyed instead of the facing sheet being peeled therefrom.

EXAMPLE 3

To prepare a waterproof corrugating adhesive, so as to maintain the waterproofing agent at the desired level, the conventional 5:1 ratio of uncooked slurry to cooked carrier is employed. This necessitates employing a cooked flour paste of high viscosity, as described below.

The procedure of Example 1 is followed, except the enzyme is omitted and the enzyme conversion stage is omitted. Valve 21 is closed and valve 27 is opened. Slurry tank 1 is charged with 40 gallons of water and 160 pounds of corn flour. Valve 7 is open and the slurry is transported by pump 13 directly to the second jet cooker 42. All adjustments from the second jet cooker 42 on are otherwise identical to those described in the preceding examples. Since the flour paste has not been enzyme-converted, the flour paste has a much higher viscosity. However, the marriage of the protein and carbohydrate into a stable co-solution still occurs. The resultant stable, but higher viscosity material is added to the secondary mixer 79 which has previously been charged with 375 gallons of water, 187 pounds of resorcinol and 16 pounds of caustic soda and 1,900 pounds of wheat starch.

When slurry tank 1 is empty, water is added by hose until water appears at the discharge 77, at which time the equipment is shut down. Then 93 pounds of 37% formaldehyde is added. The resultant adhesive is allowed to mix in the secondary mixer 79 for 10–15 minutes and is then pumped to storage tank 87.

EXAMPLE 4

The procedure of Example 3 is followed employing the following mixes:

| Primary | | Secondary | |
|---|---|---|---|
| Corn flour | 200 lb. | Wheat starch | 1,300 lb. |
| Water | 50 gal. | Water | 400 gal. |
| | | Caustic | 18 lb. |
| | | Borax | 21 lb. |

The primary mix produces 65 gallons of carrier and the secondary produces 497 gallons of slurry. Prior to pumping the carrier to the secondary mixer 79, 100 gallons of water are blended therewith, which reduce the solids contents of the finished adhesive to about 25 percent and yielded 680 gallons of adhesive.

Although the resultant adhesive has a viscosity of only 18 sec. (Stein-Hall), it produces excellent corrugated paper-board. The average pick-up of the adhesive on a 78-inch corrugator is about 4.9 pounds dry weight (1.77 gallon/1,000 sq. ft.) which is significantly

| | | | | | Adhesion (lbs.) | | | |
|---|---|---|---|---|---|---|---|---|
| | | | | | Single facer | | Double backer | |
| Lot No. | Width (in.) | Length (ft.) | Flute | Weight | Front | Back | Front | Back |
| Standard Stein-Hall adhesive. | | | C | | [1] 44 | [1] 44 | [1] 44 | [1] 44 |
| 1 | 64 | 5,661 | C | 42-1-94 | | | | |
| 2 | 64 | 2,675 | C | 69-1-69 | | | | |
| 3 | 62 | 2,208 | B | 33-1-94 | | | | |
| 4 | 62 | 7,995 | C | 42-1-42 | 50 | 50 | 50 | 42 |
| 5 | 62 | 335 | C | 42-1-91 | | | | |
| 6 | 60 | 2,161 | C | 69-1-69 | 65 | 66 | 75 | 58 |
| 7 | 60 | 10,746 | B | 42-1-42 | | | | |
| 8 | 58 | 2,263 | C | 42-1-94 | | | | |
| 9 | 58 | 8,683 | C | 69-1-93 | 62 | 56 | 62 | 62 |
| 10 | 58 | 15,414 | B | 69-1-93 | | | | |
| 11 | 54½ | 3,232 | B | 69-1-69 | | | | |

[1] Average.

less than the pick-up of conventional adhesive on the same equipment. The resultant savings over conventional Stein-Hall adhesive is 0.12 dollars/1,000 square feet.

EXAMPLES 5–8

The procedure of each of Examples 1–4 is followed except the flour paste is heated in the second jet cooker 42 to 127° C. No significant difference in properties of the finished adhesive results.

EXAMPLES 9–10

The procedure of each of Examples 1 and 2 is followed, except the enzyme is omitted from the flour slurry. Using a modification of the equipment shown in the drawing, the flour slurry is heated in the first jet cooker 23 to 155° C. The cooked paste is pumped directly to flash chamber 51 where its temperature is reduced to 77° C. The enzyme is then injected into and blended with the stream of cooled, cooked paste, using a "Static Blender" (Kinetics Corp., Boston, Mass.). The mixture is then pumped through incubation chamber 35, at a rate such that its viscosity is reduced sufficiently to produce a finished adhesive, when blended with an equal volume of starch slurry, having a Stein-Hall viscosity of 30–50 sec. The enzyme-finished flour paste is passed through a second jet cooker where its temperature is heated to above 115° C. to kill the enzyme. The hot paste is then pumped to the secondary mixing tank 79, where it is blended with the secondary mix.

EXAMPLE 11

In a modification of the apparatus shown in the drawing, 90 lbs. of reduction flour was blended into 40 gals. of water to form a slurry and pumped to cooker 42 where it was cooked at 155°C. with theoretical steam. The resultant paste was immediately cooled to 100° C., mixed with 13 lbs. of caustic in 2 gal. of water and again pumped through jet cooker 42, where it was heated with theoretical steam to 155° C. and immediately cooled to 100° C. The resultant creamy smooth, colloidal co-solution of the protein and starch fractions of the reduction flour was blended with a flour slurry prepared from 600 lbs. of reduction flour, 10 lbs. of borax and 175 gals. of water, followed by one quart of 37% fomalin.

Following the same procedure, comparable results are obtained by using mill grade corn flour air fractionated into a 30 percent dark or heavy fraction containing the large particles in the cooked portion and a 70 percent light fraction containing 1 percent particles retained on a 100 mesh screen, about 1 percent retained on a 140 mesh screen, about 5 percent on a 200 mesh screen, about 4.5 percent on a 250 mesh screen, with the remainder passing through a 250 mesh screen, in the uncooked slurry portion, blended with 13 lbs. of caustic.

The resultant adhesive has substantially the same properties as the adhesives produced according to the method described in Examples 1 and 2.

Corrugated paperboard is produced using the adhesives produced according to the procedures of each of Examples 1–10 in each instance with one of the following variations. Except for viscosity differences, the resultant adhesive has substantially the same properties as the corresponding adhesives produced in the corresponding preceding example and the corrugated paperboard produced therefrom meets or exceeds the specifications of board produced using a conventional Stein-Hall adhesive. Production rates are as high or higher than normal production rates employing a conventional Stein-Hall adhesive.

a. Corn starch is substituted for the wheat starch in the uncooked portion of the adhesive.

b. The flour paste is produced at 155° C. in the presence of only the amount of steam required to bring the slurry to that temperature. It has a creamy smooth texture and is a semi-opaque rather than a transparent yellow solution.

c. Reduction flour, i.e., the fines produced when reducing brewer's grits, (the horny portion of the corn kernel), to meet customer specifications, is employed in the cooked portion.

d. The 25–50 percent dark, i.e., course, fraction of air classified mill grade corn flour is employed in the cooked portion.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a composite adhesive for the commercial production of corrugated paperboard having an uncooked portion and an amount of a cooked portion as a carrier for the uncooked portion sufficient to impart substantial tack to the adhesive, the improvement wherein the cooked portion is a grain flour paste which is a smooth stable homogeneous colloidal co-solution, substantially free of undissolved fiber, of both the protein and starch fractions of the flour, the protein fraction being present in substantially non-degraded form and the starch fraction being present essentially as chemically unmodified starch or as molecular weight reduced starch which is otherwise chemically unmodified, whereby the resultant adhesive is viscosity-stable with substantially higher tack than conventional corrugated paperboard adhesives of the same cooked and uncooked solids content.

2. An adhesive according to claim 1 wherein the uncooked portion is a starch slurry.

3. An adhesive according to claim 2 wherein the starch of the starch slurry is corn or wheat starch.

4. An adhesive according to claim 1 wherein the flour is corn, milo or wheat flour.

5. An adhesive according to claim 4 wherein the flour is corn, flour.

6. An adhesive according to claim 1 wherein the starch fraction of the flour is present essentially as chemically unmodified starch.

7. An adhesive according to claim 1 containing an amount of formaldehyde effective to render the mixture stable to microbiological degradation.

8. An adhesive according to claim 1 wherein the adhesive comprises caustic and borax.

9. An adhesive according to claim 1 wherein the uncooked portion is a starch slurry the solids of which comprise about one-half to eleven-twelfths of the total solids of the mixture.

10. An adhesive according to claim 8 wherein the starch fraction of the flour is present essentially as chemically unmodified starch.

11. An adhesive according to claim 10 wherein the flour paste is a clear transparent solution, substantially free from undissolved flour particles.

12. An adhesive according to claim 10 wherein the flour is corn flour.

13. An adhesive according to claim 12 wherein the mixture contains an amount of formaldehyde effective to render the mixture stable to microbiological degradation.

* * * * *